(12) United States Patent
Odegard

(10) Patent No.: US 8,851,862 B2
(45) Date of Patent: Oct. 7, 2014

(54) OIL SAND SLURRY TRANSPORTATION SYSTEM AND METHOD FOR VARIABLE SLURRY FLOW RATES

(75) Inventor: Mark L. Odegard, Edmonton (CA)

(73) Assignee: Suncor Energy Inc., Calgary (CA)

( * ) Notice: Subject to any disclaimer, the term of this patent is extended or adjusted under 35 U.S.C. 154(b) by 853 days.

(21) Appl. No.: 12/960,096

(22) Filed: Dec. 3, 2010

(65) Prior Publication Data

US 2012/0141298 A1 Jun. 7, 2012

(51) Int. Cl.
*F04D 7/04* (2006.01)
*F04B 49/00* (2006.01)

(52) U.S. Cl.
CPC .............. *F04B 49/002* (2013.01); *Y10S 417/90* (2013.01)
USPC ................ 417/237; 417/22; 417/42; 417/900

(58) Field of Classification Search
USPC ....................... 417/22, 42, 237, 334, 335, 900
See application file for complete search history.

(56) References Cited

U.S. PATENT DOCUMENTS

| | | | |
|---|---|---|---|
| 3,614,268 A * | 10/1971 | Merenda | 417/237 |
| 4,108,574 A | 8/1978 | Bartley et al. | |
| 6,776,584 B2 | 8/2004 | Sabini et al. | |
| 7,093,382 B1 | 8/2006 | Price | |
| 2006/0249431 A1 * | 11/2006 | Cymerman et al. | 208/391 |

FOREIGN PATENT DOCUMENTS

| | | |
|---|---|---|
| WO | 2007/005885 A2 | 1/2007 |
| WO | 2007/005885 A3 | 1/2007 |

OTHER PUBLICATIONS

Hugues, Austin, Electric Motors and Drives: Fundamentals, Types and Applications, 3rd edition, p. 120, Figure 3.16, Nov. 19, 2005.

* cited by examiner

*Primary Examiner* — Charles Freay
*Assistant Examiner* — Philip Stimpert
(74) *Attorney, Agent, or Firm* — McDermott Will & Emery LLP

(57) ABSTRACT

Provided is a system for transporting an oil sand slurry, comprising a pump, upstream and downstream lines, a shaft connectable to the pump, a driving mechanism driving the pump and a regulator for regulating the torque applied to the shaft between positive and negative torque modes, to pump the slurry at higher or lower flow rates. Also provided is a method comprising pumping the slurry through a pipeline using a pump driven by a motorised shaft and adjusting the flow rate of the slurry by varying the torque applied to the motorised shaft between positive and negative torque modes. The oil sand slurry transportation system and method enable positive head (regular pump action) for normal and high flow rates and negative head (pump brake action) for low flow rates, which reduces system energy loss, pipeline wear, vapor breakout and sanding off.

28 Claims, 1 Drawing Sheet

OIL SAND SLURRY TRANSPORTATION SYSTEM AND METHOD FOR VARIABLE SLURRY FLOW RATES

FIELD OF THE INVENTION

The invention generally relates to the field of transporting oil sand slurries, and more particularly to a system and method of transporting an oil sand slurry.

BACKGROUND

In traditional mining, slurry pipeline systems are built with significant reservoir capacity to maintain a steady flow rate. Oil sands slurry pipeline systems have limited reservoir capacity and as a result may have a highly variable flow rate. The flow rate may be increased or decreased for a variety of reasons depending on, for instance, changing upstream availability of oil sands slurry as well as other process operating constraints.

Enabling efficient flow of a slurry, such as oil sands slurry, through a pipeline also requires some operating conditions that are not normally required for other liquids. For instance, it is desirable to maintain an adequate flow rate in the pipeline when operating at low flow rates to avoid "sanding off", which is when some of the oil sands normally suspended in the solvent come out of suspension thereby hindering the flow and increasing wear on pipeline equipment.

Variable flow rate slurry flowing downhill in undulating terrain, such as in an oil sands mine, thus requires a smaller pipeline diameter in order to maintain adequate line pressure during times of reduced flow rate. Unfortunately, using a smaller pipeline diameter results in excessive pipeline wear and system energy loss at normal or high flow rates. Current industry practice is to accept the energy loss and install sacrificial wear components such as reduced line size sections, orifice plates or valves.

Oil sands mining and transportation are also fraught with harsh conditions and oils sands slurry can be more damaging on pipeline equipment than other fluids and suspensions traditionally transported by pipeline.

There is currently a need for a technology that overcomes at least one of the disadvantages of what is currently known and used in the field.

SUMMARY OF THE INVENTION

The present invention responds to the above-mentioned need by providing a slurry transportation system and method for transporting slurry.

More particularly, the present invention provides a slurry transportation system for transporting an oil sand slurry, comprising:
  a pump having an inlet for receiving the slurry and a discharge for discharging the slurry;
  an upstream line in fluid communication with the inlet and a downstream line in fluid communication with the discharge;
  a shaft connectable to the pump;
  a driving mechanism connectable to the shaft to drive the same to operate the pump;
  a regulator connectable to the driving mechanism for regulating the torque applied to the shaft, to allow the driving mechanism to drive the shaft in a positive torque mode to cause the pump to discharge the slurry at a higher flow rate, or in a negative torque mode to cause the pump to discharge the slurry at a lower flow rate.

The present invention also provides a slurry transportation method for transporting an oil sand slurry, comprising:
  pumping the slurry through a pipeline using a pump driven by a motorised shaft; and
  adjusting the flow rate of the slurry by varying the torque applied to the motorised shaft between a positive torque mode enabling the pump to discharge the slurry at a higher flow rate, and a negative torque mode enabling the pump to discharge the slurry at a lower flow rate.
  to the motorized shaft if the downstream flow rate is to be low.

The oil sand slurry transportation system and method enable positive head (regular pump action) for normal and high flow rates and negative head (pump brake action) for low flow rates. This pump brake action can reduce system energy loss and pipeline wear, for instance due to eliminating the requirement for a reduced size section and allowing larger overall line size, while enabling efficient reduction of vapour breakout and sanding off.

The positive-negative torque regulation allows efficient adaptation to variable oil sands processing and transportation conditions. By allowing a negative torque to be applied to the shaft, the flow rate can be reduced in a simple and efficient manner.

DETAILED DESCRIPTION OF PREFERRED EMBODIMENTS

Figure 1:
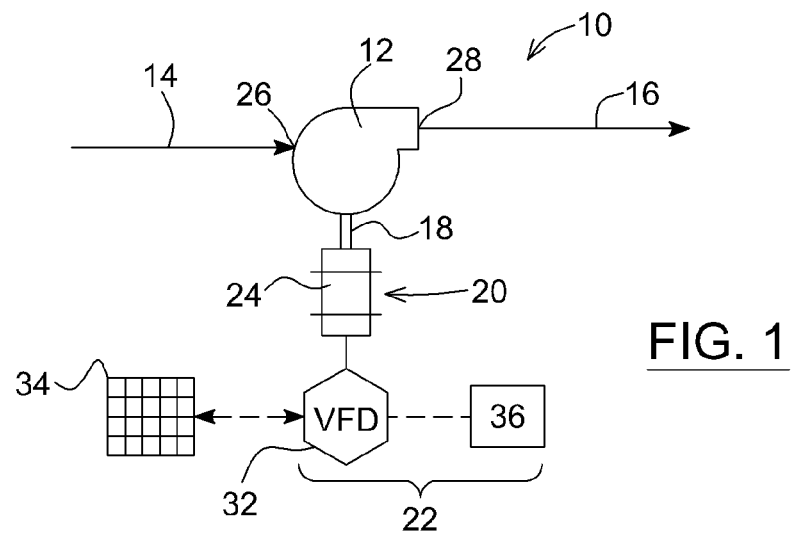
FIG. 1 is a block diagram schematic of one embodiment of the present invention.
Figure 2:
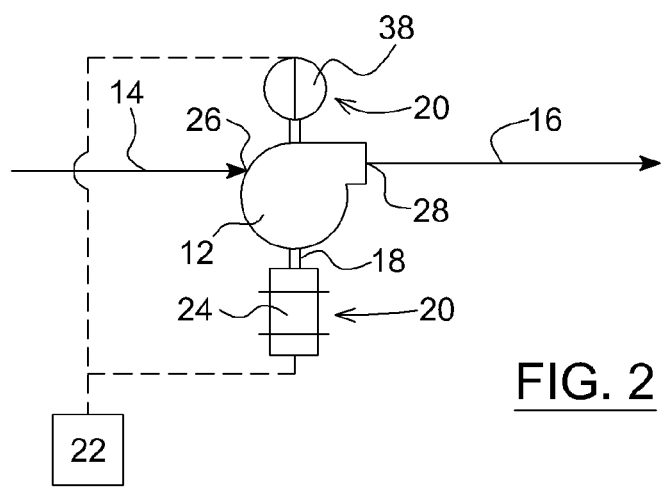
FIG. 2 is a block diagram schematic of another embodiment of the present invention.
Figure 3:
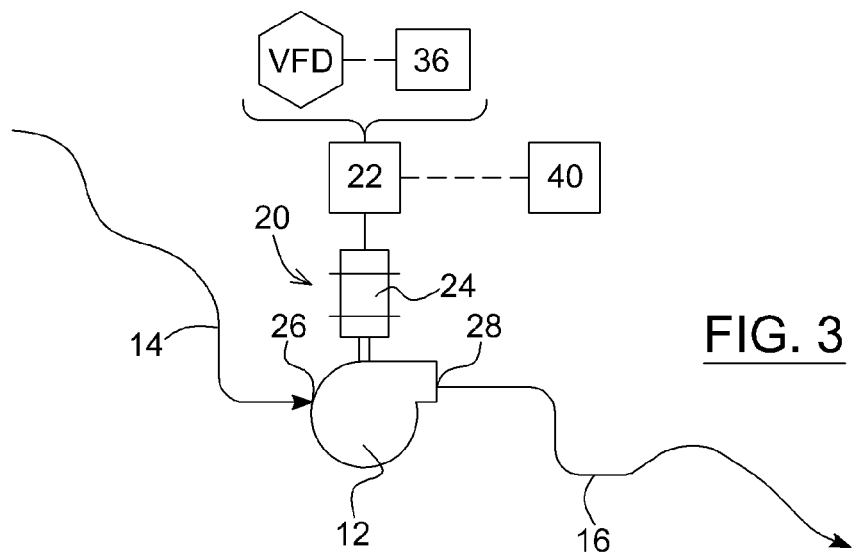
FIG. 3 is a block diagram schematic of yet another embodiment of the present invention.

Preferred embodiments of the oil sand slurry transportation system 10 are illustrated in FIGS. 1-3.

The oil sand slurry transportation system 10 is preferably integrated into a pipeline system for transporting slurry such as oil sands slurry to downstream reservoirs or processing units. The slurry may include a variety of oil sands slurries, such as at-face mined oil sand slurry, primary or secondary middlings or tailings slurries, fine tailings or mature fine tailings slurry. Depending on their origin and stage of processing, the oil sand slurries contain various quantities of sand, bitumen, clay, chemical processing additives and other compounds inherent to the mined oil sand ore.

The slurry transportation system 10 includes a pump 12, an upstream line 14 and a downstream line 16, a shaft 18 connected to the pump 12, a driving mechanism 20, and a regulator 22.

It should be understood that the upstream and downstream "lines" are preferably pipelines but may also be the inlet or outlet of processing equipment such as tanks, reaction vessels, and the like.

Referring to FIG. 1, the pump 12 may be a centrifugal pump having an impeller (not illustrated) connected to a shaft that is driven by the driving mechanism 20 which in this case consists of a motor 24. The driving mechanism 18 is in turn coupled to the regulator 30 which regulates the torque applied to the shaft, to allow the driving mechanism 18 to drive the shaft 18 in a positive torque mode to cause the pump 12 to discharge the slurry at a higher flow rate, or in a negative torque mode to cause the pump to discharge the slurry at a lower flow rate.

It should be understood that "negative torque mode" includes the point at which zero torque is applied. At this point, there will only be a pressure drop across the pump that amounts to the friction losses within the pump. It should also be understood that "higher flow rate" and "lower flow rate" are meant relative to each other.

The pump 12 has an inlet 26 for receiving the slurry from the upstream line 14 and a discharge 28 for expelling the slurry through the downstream line 16. It should be noted that the centrifugal pumps 12 used in this system 10 can be further adapted to improve efficiency of providing negative head, for example with tailored impeller design.

Referring to FIG. 1, the driving mechanism 18 is a single motor 24 and the regulator 30 includes a variable frequency device 32 (hereafter referred to as a VFD). The VFD 32 is programmed to operate the motor 24 in such a way that a positive torque is applied to the shaft 18 during times of high process flow rates and a negative torque is applied to the shaft 18 during times of low process flow rates. The VFD 16 may be powered by the power grid 34.

Still referring to FIG. 1, the regulator 22 may also include a control unit 36 that is coupled to the VFD 16. The control unit 36 monitors various operating conditions, makes calculations to determine the direction and magnitude of torque to be applied, and provides signals to the VFD 16 to change or otherwise regulate the torque applied to the shaft 18 to obtain given flow rates and slurry pressures.

The control unit 36 can calculate the torque to be applied based on a number of variables. For instance, the pressure at the pump inlet, the pressure change in the pump, the slurry composition, the friction loss in the pipeline system, and other upstream and downstream constraints, may be used to calculate the applied torque to obtain a given slurry flow rate. There are a number of empirical equations and calculation methods to determine the flow rate and corresponding torque to apply.

In operation, the slurry transportation system 10 can allow high, normal or low flow rates, which will be described below.

Normal and High Flow Rates—Positive Head

For a normal or high flow rate, a positive torque is applied to the shaft 18 so that there is a head gain between the pump inlet and the pump discharge. At these flow rates, it can be said that there is regular pump action.

Flow Rate Transition

In response to a requirement for a decreased slurry flow rate, the positive torque applied to the shaft is reduced. At zero applied torque, there will only be a pressure drop across the pump that amounts to the friction losses within the pump.

Low Flow Rates—Negative Head

When the flow rate is to be further decreased, for instance in response to a requirement for greater back pressure, a negative torque is applied to the shaft to resist the flow of fluid through the pump 12. At such low flow rates the control unit 36 determines the optimal negative torque to be applied to the shaft 18, and communicates this to the motor 24 via the VFD 32.

The negative torque may be set in order to allow the slurry to flow at sufficient rate and pressure so as to maintain the oil sands solids in flowable suspension and thus reduce or avoid "sanding off". It is noted that a pressure above the vapour pressure of the solvent does not impact sanding off. It is also noted in this regard that the turbulence of the slurry flow will be a function of the rate and line size.

The negative torque may also be set and transitioned to in order to minimize the likelihood of vapour breakout, which would occur at higher elevations relative to the pump where the pressure is low and may be hundreds of meters from the pump. Applying negative torque reduces or eliminates vapour breakout, since it increases the pressure drop across the pump thus increasing the pressure further upstream to increase the line pressure above the vapour pressure of the slurry solvent. Furthermore, the negative torque mode capability of the system allows controlled and continuous flow rate adjustment for transient conditions experienced in oil sands mining and pipeline transport.

The slurry transportation system 10 is particularly applicable in downhill undulating terrain such as in oil sands mining and slurry transport, as illustrated in FIG. 3, since the system pressure in such cases is sufficient to allow the slurry to flow via gravity to its destination without a pump at a flow rate that may be called the no-pump flow rate. Thus, when an even lower flow rate is desired, the slurry transportation system 10 causes a braking action in the pump 12 in negative torque mode. It should be understood that the inlet pressure is sufficiently greater than the discharge pressure, as a result of the braking action of the pump 12 in low flow rate conditions.

In the preferred embodiment of the slurry transportation system 10 illustrated in FIG. 1, there is a single variable speed and direction motor 24 coupled to the pump 12 and regulated by the VFD 32 for applying positive or negative torque to its shaft 18.

In another optional embodiment of the system 10 as illustrated in FIG. 2, there can be a motor 24 and a generator 38 coupled to a single pump 12. The coupling of the motor 24 and the generator 38 may be on different sections of the shaft 18. The motor 24 can apply a positive torque to the pump 12 and the generator 38 can apply a negative torque. The motor/generator embodiment can be controlled by one or more regulator 22, which may include a VFD, to enable a positive or negative torque mode.

Referring to FIG. 1, in one optional aspect of the slurry transportation system 10, when operating in negative torque mode, the system 10 dissipates the braking energy by either sending it back as reject energy to the power grid 34. Referring to FIG. 3, the braking energy may be delivered to an energy receptor 40 electrical load resistor. A variety of regenerative braking techniques may be employed to recover the braking energy as electricity or as heat for reuse in the system or the mining operation at large. Thus, in negative torque mode, the inlet slurry pressure is divided into braking energy and the discharge fluid pressure. The discharge fluid pressure should of course be sufficient to allow the oil sands slurry to flow properly downstream. The control unit 36 may monitor and control the torque magnitude and direction.

The slurry transportation method of the present invention for transporting slurry, includes pumping the slurry through a pipeline using a pump driven by a motorised shaft; and adjusting the flow rate of the slurry by varying the torque applied to the motorised shaft between a positive torque mode enabling the pump to discharge the slurry at a higher flow rate, and a negative torque mode enabling the pump to discharge the slurry at a lower flow rate. The illustrated embodiments of the system 10 may be used to perform this method.

The embodiments of the slurry transportation system and method enable a number of advantages. For instance, traditional methods of increasing back pressure with valves and orifice plates that suffer from excessive wear can be reduced or avoided. In addition, by using the system of the present invention, pipeline wear and system energy loss can be reduced during times of normal and high process flow rates. At normal and high flow rates the pump operates in the standard way, the reduction of energy loss and component wear results from using larger pipes. In other words, the system exerts continuous and adaptive control over the flow rate of the slurry so that low flow rates can be achieved in larger pipes while respecting the pressure requirements for maintaining the desirable flow properties of the oil sands slurry. Thus, larger pipeline diameters can be used to increase the maximum flow rate, reduce pipeline wear and reduce system energy loss.

In addition, existing pipeline systems may be retrofitted with the slurry transportation system 10 of the present invention. In such a case, the slurry transportation system 10 allows increased adaptability in achieving low flow rates by avoiding equipment such as throttling valves and orifice plates. The continuous control of the flow rate optimizes energy use and minimizes pipeline wear in the transient conditions of oil sands mining.

In one preferred aspect of the slurry transportation system, the pump is located in-line in a pipeline and the pipeline does not require any additional units for increasing or decreasing the slurry pressure. For instance, the slurry transportation system enables avoiding the necessity of open-ended cylinders and the like integrated in the pipeline. The pipeline with in-line pump thus may be a closed-system. Alternatively, there may be additional units in combination with some embodiments of the present invention to further increase or reduce the line pressure, depending on elevation, flow rate requirements (for instance, outside of preferred flow rate ranges), pump design and other variables. Furthermore, there may be one or more additional pumps, each with its corresponding driving mechanism, shaft, and regulator, arranged in series with the first. One regulator could also control the magnitude and direction of both pumps. This in-series arrangement may be used in situations of high elevation change and of very high or low flow rates. It should also be noted that the system may include various in-series or in-parallel pump combinations tailored to a given pipeline topography.

It should be understood that numerous modifications could be made to the embodiments of the present invention described hereinabove, without departing from what has actually been invented. For instance, different configurations of the system may employ one or more pumps, motors, shaft sections connected to parts of the driving mechanism, VFDs and control units, in various configurations, given the constraints of the oil sands mine and desired operating conditions.

The invention claimed is:

1. A slurry transportation system for transporting an oil sand slurry, comprising:
    a pump having an inlet for receiving the slurry and a discharge for discharging the slurry;
    an upstream line in fluid communication with the inlet and a downstream line in fluid communication with the discharge;
    a shaft connectable to the pump;
    a driving mechanism connectable to the shaft to drive the same to operate the pump;
    a regulator connectable to the driving mechanism for regulating discharge flow rate from the pump, the regulator being configured to:
        regulate torque applied to the shaft; and
        operate the driving mechanism in a positive torque mode during times of high process flow rates to cause the pump to discharge the slurry into the downstream line at a higher flow rate, and in a negative torque mode during times of low process flow rates to cause the pump to discharge the slurry into the downstream line at a lower flow rate.

2. The slurry transportation system of claim 1, wherein the oil sand slurry comprises at-face mined oil sand slurry, primary middlings slurry or secondary middlings slurry, or tailings slurry.

3. The slurry transportation system of claim 1, wherein the driving mechanism comprises a motor and the regulator is configured to cause the motor to operate between the positive torque mode and the negative torque mode.

4. The slurry transportation system of claim 3, wherein the regulator comprises a variable frequency device electrically connectable to the motor.

5. The slurry transportation system of claim 4, wherein the regulator further comprises a control unit coupled to the variable frequency device to automatically control whether the shaft is in the positive torque mode or the negative torque mode.

6. The slurry transportation system of claim 1, further comprising an energy receptor for receiving braking energy emitted in the negative torque mode.

7. The slurry transportation system of claim 6, wherein the energy receptor is an electrical load resistor.

8. The slurry transportation system of claim 1, wherein the pump is a centrifugal pump having an impeller connected to the shaft for allowing pumping of the slurry.

9. The slurry transportation system of claim 1, wherein the upstream line extends to a higher elevation than the pump, and the regulator is configured to regulate the torque to reduce vapour breakout in the upstream line.

10. The slurry transportation system of claim 9, wherein the downstream line extends to a lower elevation than the pump, allowing the slurry to flow at least partially by gravity.

11. The slurry transportation system of claim 1, wherein the upstream line and the downstream line are arranged in a generally downhill and undulating configuration.

12. The slurry transportation system of claim 1, wherein the regulator is configured to regulate the direction and magnitude of the torque to allow sufficient flow rate and pressure to maintain particles in suspension within the upstream and downstream lines and reduce or avoid sanding off.

13. The slurry transportation system of claim 1, wherein the regulator is configured to regulate the torque in response to at least one of the following operating conditions:
    pressure at the pump inlet;
    pressure change in the pump;
    composition of the slurry; and
    friction loss in a given section of the upstream line or the downstream line.

14. The slurry transportation system of claim 1, wherein the driving mechanism comprises a motor for operating the pump in the positive torque mode and a generator for operating the pump in the negative torque mode, both the motor and the generator being connected to the shaft.

15. A slurry transportation method for transporting an oil sand slurry, comprising:
    pumping the slurry through a pipeline in a downstream direction using a pump driven by a motorised shaft; and
    regulating discharge flow rate of the slurry from the pump by regulating torque applied to the motorised shaft between a positive torque mode during times of high process flow rates enabling the pump to discharge the slurry in the downstream direction at a higher flow rate, and a negative torque mode during times of low process flow rates enabling the pump to discharge the slurry in the downstream direction at a lower flow rate.

16. The slurry transportation method of claim 15, wherein the oil sand slurry comprises at-face mined oil sand slurry, primary middlings slurry or secondary middlings slurry, or tailings slurry.

17. The slurry transportation method of claim 15, wherein the regulating of the torque is performed by operating a motor connected to the shaft between the positive torque mode and the negative torque mode.

18. The slurry transportation method of claim 17, wherein the operating of the motor is regulated by a variable frequency device.

19. The slurry transportation method of claim 15, comprising controlling the direction and magnitude of the torque to allow sufficient flow rate and pressure of the slurry to maintain particles in suspension and reduce or avoid sanding off.

20. The slurry transportation method of claim 15, comprising controlling the direction and magnitude of the torque to reduce or avoid vapour breakout upstream from the pump.

21. The slurry transportation method of claim 15, further comprising assessing at least one of the following operating conditions:
    pressure at the pump inlet;
    pressure change in the pump;
    composition of the slurry;
    friction loss in a given section of the pipeline; and
    determining the direction and magnitude of torque to apply to the motorised shaft based on at least one of the operating conditions.

22. The slurry transportation method of claim 15, further comprising receiving pump braking energy emitted in the negative torque mode.

23. The slurry transportation method of claim 22, wherein the pump braking energy is received by an electrical load resistor.

24. The slurry transportation method of claim 22, further comprising sending at least part of the pump braking energy to a grid.

25. The slurry transportation method of claim 22, further comprising using at least part of the pump braking energy to at least partially power the motor in the positive torque mode.

26. The slurry transportation method of claim 15, wherein the adjusting of the torque is performed by operating a motor connected to the shaft for the positive torque mode and operating a generator connected to the shaft for the negative torque mode.

27. A slurry transportation method for transporting an oil sand slurry, comprising:
    pumping the slurry through a pipeline using a pump driven by a motorised shaft; and
    adjusting the flow rate of the slurry by adjusting the torque applied to the motorised shaft between a positive torque mode enabling the pump to discharge the slurry at a higher flow rate, and a negative torque mode enabling the pump to discharge the slurry at a lower flow rate; and
    controlling the direction and magnitude of the torque to reduce or avoid vapour breakout upstream from the pump.

28. A slurry transportation method for transporting an oil sand slurry, comprising:
    pumping the slurry through a pipeline using a pump driven by a motorised shaft; and
    adjusting the flow rate of the slurry by adjusting the torque applied to the motorised shaft between a positive torque mode enabling the pump to discharge the slurry at a higher flow rate, and a negative torque mode enabling the pump to discharge the slurry at a lower flow rate;
    receiving pump braking energy emitted in the negative torque mode; and
    using at least part of the pump braking energy to at least partially power the motor in the positive torque mode.

* * * * *